United States Patent [19]
Giannone

[11] 3,856,069
[45] Dec. 24, 1974

[54] TIRE CHAIN DEVICE
[76] Inventor: Victor S. Giannone, 952 Central Ave., Peekskill, N.Y. 10566
[22] Filed: Oct. 23, 1973
[21] Appl. No.: 408,398

[52] U.S. Cl.................. 152/233, 152/217, 152/221, 152/225
[51] Int. Cl............................................ B60c 27/02
[58] Field of Search.... 152/213 R, 213 A, 217–219, 152/221, 223, 225, 231, 239, 240, 241

[56] References Cited
UNITED STATES PATENTS
1,809,443  6/1931  Frazier............................... 152/218
2,507,037  5/1950  Miller.................................. 152/225
2,638,954  5/1953  Anderson............................ 152/217
2,714,913  8/1955  Behnke............................ 152/213 R Primary Examiner—Drayton E. Hoffman
Attorney, Agent, or Firm—Robert G. McMorrow

[57] ABSTRACT

A vehicle tire chain assembly has inboard and outboard flexible retention means and a series of link chains extending between the components of the retention means at spaced intervals. The retention means is at least in part circumferentially adjustable whereby the unit is applicable to wheels of diverse dimensions. Means associated with the retention means serve to form the latter into rectilinear sections.

5 Claims, 7 Drawing Figures

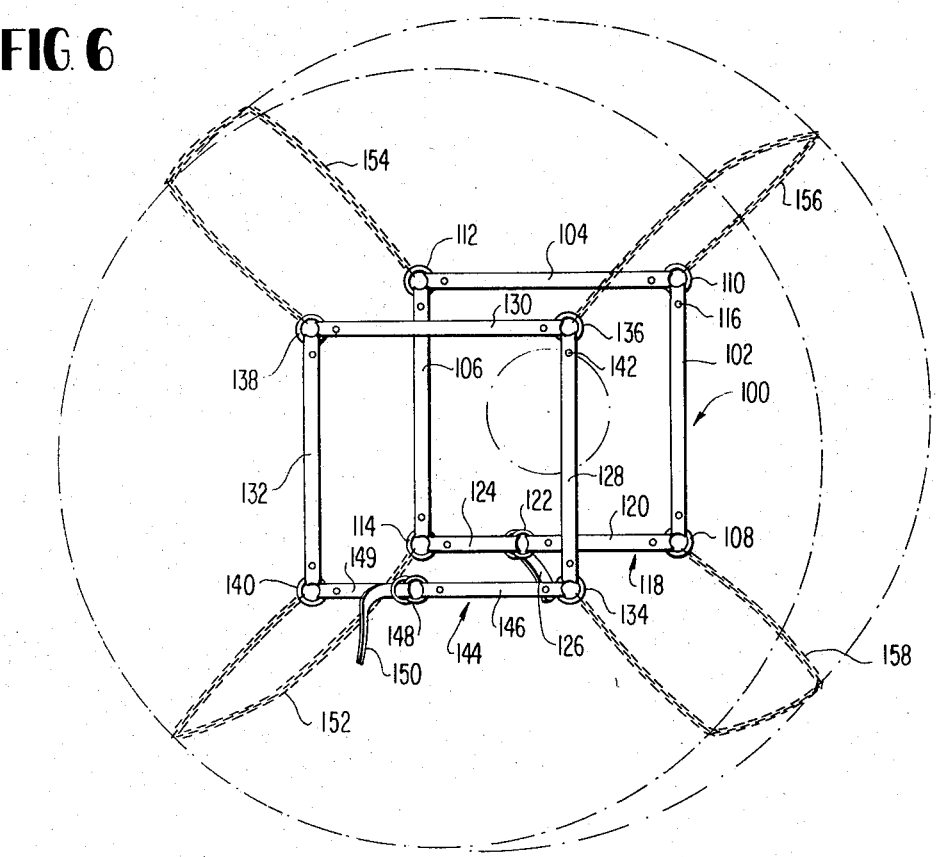

TIRE CHAIN DEVICE

BACKGROUND OF THE INVENTION

1. Field of the Invention

This invention pertains to vehicle traction chain devices, and more particularly, to a tire chain device which is readily mounted and dismounted without the necessity for removal of the wheel or elevation of the wheel from the ground.

2. Statement of Prior Art

Vehicle tire chains embodying annular inner retention means and spaced series of cross link assemblies have been heretofore proposed. Examples of the prior proposals include the following:

| Patent No. | Patentee | Issued |
| --- | --- | --- |
| Re.15,183 | Gries | Aug. 30, 1921 |
| 1,441,113 | Pepper | Jan. 2, 1923 |
| 2,234,492 | Henry | March 11, 1941 |
| 2,638,954 | Anderson | May 19, 1953 |

SUMMARY OF THE INVENTION

The present invention relates to vehicle tire chain devices which are readily applied to a wheel and tire assembly without the necessity for removal of the wheel from the vehicle or jacking of the vehicle. The devices include inboard strap members which are initially connected to the wheel inner side by an adjustable connector, and outboard straps secured on the wheel on the outer side thereof, the latter also having changeable fastening means to permit close adjustment. A series of cross link chains extend about the tire treat between the straps.

In one embodiment of the invention, the straps are provided with a series of transversely aligned plates which serve to correctly position the straps and as a means for support of the link chains. Additionally, the straps have indicia thereon related to standard wheel and tire dimensions to permit rapid and accurate installation.

In an alternate embodiment, the straps have ring members to position the straps, and to serve as the chain support means.

By virtue of the adjustability of the straps, the chain assemblies are of substantially universal size and are readily attached to wheels of all standard sizes. Prototype tests indicate that such assemblies may be applied in an average time span of approximately ninety seconds.

When not in use, the units hereof are extremely compact, and are easily stored in the limited space available in modern vehicles.

The units are characterized by simplicity in construction and installation procedures, and may be readily applied by persons not mechanically inclined.

The units may also be color coded as to the particular strap intended for attachment to the rear and front of the wheel thereby further simplifying attachment.

An additional object of importance resides in the provision of an attachment embodying two substantially continuous main retaining members fabricated of lightweight materials. This eliminates the necessity for restraining devices to act against centrifugal forces created in earlier devices by heavy chains.

Still another ojbective is to provide an attachment which is of minimum weight, one which is durable, easy to clean, and which has only a minimum area subject to rust or corrosion.

Yet another objective is to provide attachment means comprising two lightweight retaining members, each having both ad adjustment means and a coupling device.

Other and further objects and advantages of the invention will become apparent to those skilled in the art from a consideration of the following specification when read in conjunction with the annexed drawings.

BRIEF DESCRIPTION OF THE DRAWINGS

FIG. 6 is a view similar to FIG. 1, but disclosing a modification of the invention; and FIG. 7 is an enlarged detail elevational view of a ring connector and portions of the adjacent strap and chain means.

DESCRIPTION OF THE PREFERRED EMBODIMENTS

Figure 1:
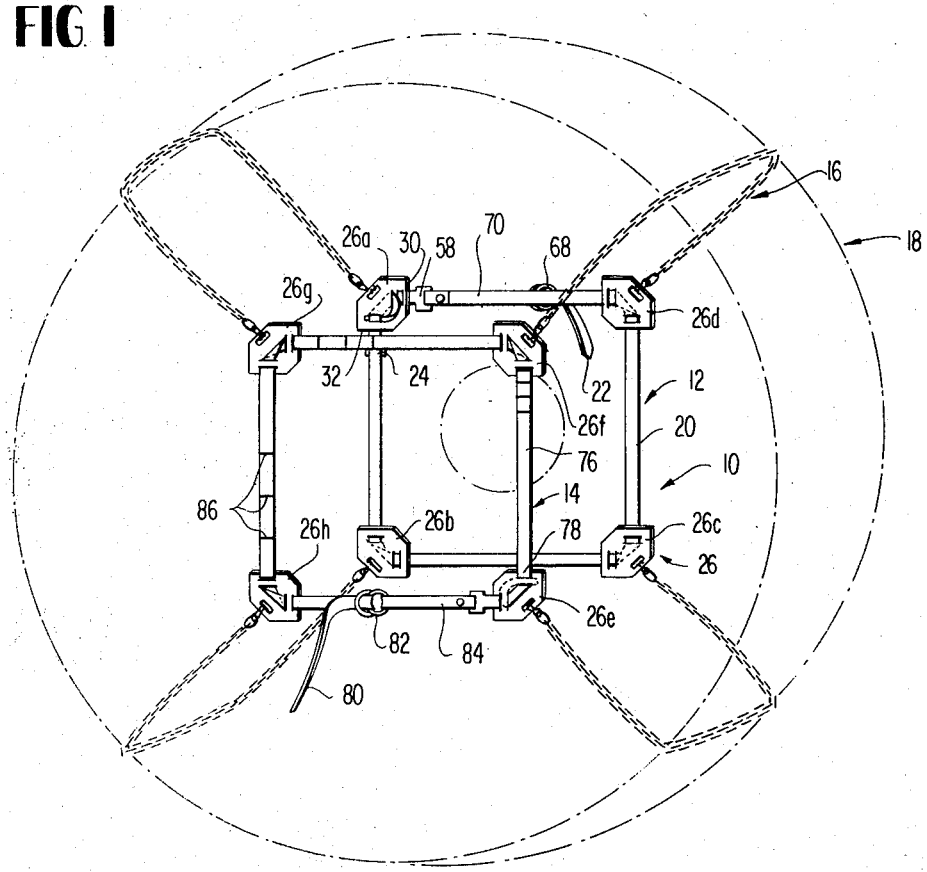
FIG. 1 is a perspective view showing a chain assembly constructed and assembled in accordance with the teachings of this invention in place on a tire/wheel assembly (the latter being shown only in phantom lines)
Figure 2:
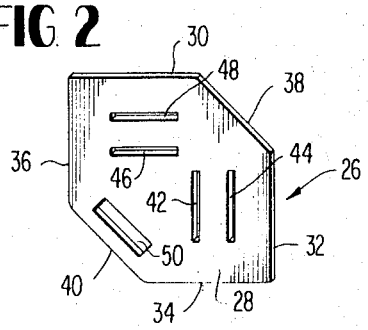
FIG. 2 is an enlarged elevational view of one of the corner plates hereof.

Referring to the drawing in more detail, a first chain device hereof is therein generally identified by reference numeral 10. The chain device includes an inboard strap assembly 12, an outboard strap assembly 14 and a plurality of cross link chain means 16. The device is shown in FIG. 1 as applied to a wheel/tire 18.

The inboard strap assembly 12 comprises a strap member 20 having a first end 22 and a second end 24. A plurality of corner brackets 26 are provided, all being of similar construction. Each of these corner brackets comprises a flat metallic plate 28 with side edges 30, 32 and 34, 36, a slant inner edge 38 and a slant corner 40. The plate has entry and exit slots 42, 44 and 46, 48 formed therein substantially parallel to the edges 30 and 32, and also has a slot 50 for connection of the chain which is parallel to the slant edge.

Figure 4:
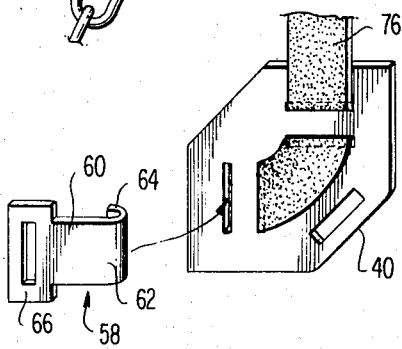
FIG. 4 is a partially disassembled view showing another of the plates and strap connector brackets used therewith.

An end bracket 58 secured to one of the plates comprises an elongated stem 60 formed of bendable material which is formed by reversion to U-shape, with an outer flight 62 and an inner flight 64. A frame portion 66 defining a substantially rectangular opening is integrally affixed to the stem 60. As best seen in FIG. 4, the stem 60 is inserted into an entry slot 44 and then reverted about the plate.

Figure 5:
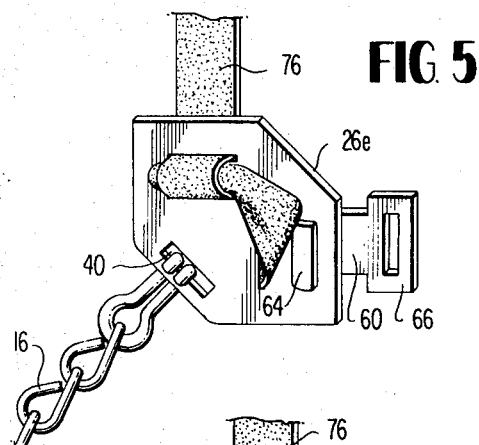
FIG. 5 is an opposite face view of the plate of FIG. 4, also showing the connection of the chain thereto.

In FIG. 1 the end 24 of the strap 20 is secured to the corner bracket 26a. This connection is accomplished by extending the strap through the entry slots of the plate 26a, and through one of the exit slots thereof to the rear of the plate. Thereafter, in the manner suggested in FIG. 5, the strap end is extended back under that portion of the strap between the entry slots, and frictionally held thereby.

The end 22 of the strap is engaged releasably in a double loop buckle 68 on a short strap 70 for adjustment purposes. The opposite end of the short strap 70 is engaged permanently with a frame end 66 of one of the end brackets which in turn is engaged in the remaining exit slot of plate 26a.

It will be noted that strap 20 passes through the entry and exit slots of the plates 26b, 26c and 26d. Between these entry and exit slots, it is formed into a bend portion as indicated in FIG. 3.

Figure 3:
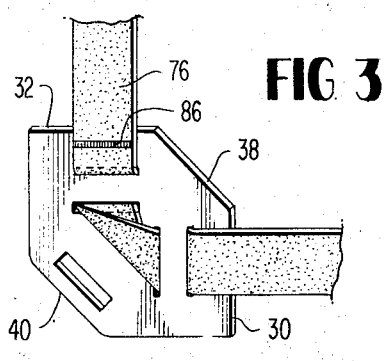
FIG. 3 is a view similar to FIG. 2 but showing the strap means hereof.

The outboard strap assembly 14 comprises a strap 76 having a first end 78 affixed to the end connector 26e in the manner described above and shown in FIG. 5, and the strap is then extended through the slots of brackets 26f, 26g and 26h in the manner shown in FIG. 3. The second end 80 of the strap is adjustably connected to a double ring buckle 82. The buckle is also connected permanently to a strap 84, the distal end of which is secured to still another end connector secured to the bracket 26e.

It will be noted that the chain means 16 extend between the pairs of brackets of the inboard and outboard straps which are aligned when in place, the corner brackets serving to form the straps into parallel rectilinear strap sections. In view of the variance in wheel diameters encountered, it is desirable that indicia 86 be provided on the straps as a guide to adjustment. Such indicia may be color coded if desired.

Installation of the strap of the first form of the invention involves positioning of the inboard strap initially, preadjusted as to length in accordance with said indicia. In some circumstances, a length of rod or wire may be useful in locating and aligning the ends of the strap. Thereafter, the outboard strap is formed into its parallel rectilinear strap sections and adjusted to tight condition by continued pressure on the end 80. The adjustability of the strap permits fine adjustment which avoids undue wear on the chain and also avoids loose chain conditions which tend to inhibit traction or to pose a potential threat to the vehicle due to striking the same upon rotation.

Referring to FIGS. 6 and 7, a second form of the invention is therein disclosed. Here, the chain assembly 100 has an inner strap system comprising a series of three connecting straps 102, 104 and 106. Each strap is of nylon or similar material, and is permanently attached to a corner ring 108, 110, 112 and 114. The manner of such attachment comprises reversion of the strap ends through the rings, followed by the application of rivets 116. It will be observed that the straps are of similar lengths following attachment. The inner strap system further includes an adjustment strap 118 of two part form. The first of these parts 120 has a double loop buckle 122 secured thereto by a rivet, and extends from the ring 108. The second part 124 has a free end 126 and extends from the ring 114, the end of 126 being releasably and adjustably engaged in the buckle 122.

An outer strap system comprises a series of three outer connecting straps 128, 130 and 132, contacting four ring mmembers 134, 136, 138 and 140. Rivets 142 are employed to secure the ends of the fabric straps about the metallic ring members. An adjustment strap assembly 144 comprises a first section 146 secured to one end of the ring member 134 and having a double loop buckle 148 at its other end. The strap 144 also includes a second section 149 fixedly secured to the ring member 140, and having a free end 150 engaged with the buckle 148.

FIG. 7 shows a typical ring member 140 and the manner in which the straps and strap sections contact the same. Also shown is the connection of a chain member 152 to the ring. It is to be noted that a series of chains 152, 154, 156 and 158 are provided, and extend respectively between the ring numbers 114 and 140, 112 and 138, 110 and 136, and 108 and 134.

The chain assembly 100 is attached to a wheel by initially pre-adjusting and positioning the inner strap system. Thereafter, the outer system is tight, all in a manner as described above.

I claim:

1. A tire chain assembly for a vehicle wheel comprising:
    inboard and outboard straps of flexible material, each of said straps having opposite ends releasably secured together, at least one of said straps being of adjustable circumference;
    means on said straps forming the straps into rectilinear strap sections;
    said means comprising corner plates;
    the corner plates having entry slots, exit slots and slant corner slots;
    the sections of the respective straps being substantially transversely aligned and substantially parallel to one another;
    link chains extending between the inboard and outboard straps at spaced locations; and
    the straps extending through said entry and exit slots and the link chains being secured to the corner slots.

2. The invention of claim 1, and:
    strap connection brackets securing the straps to at least one of the corner plates.

3. The invention of claim 2, wherein:
    each of said straps is provided with indicia to correspond to a selected circumference related to vehicle wheel dimensions.

4. A tire chain assembly for a vehicle wheel and tire, the tire chain assembly comprising:
    a tire chain engaging strap means comprising a first strap member having first and second ends and a second strap member;
    a series of inboard strap corner plates, each having a plurality of entry slots, a plurality of exit slots and a slant corner slot, on the strap with the first strap extending through one entry slot and one exit slot of at least one of said inboard strap corner plates;

strap connector brackets securing the first strap to at least another of said inboard corner plates, the corner plates forming the inboard strap to rectilinear strap sections therebetween;
    each corner plate having a chain connection opening formed therein;
    the second strap means comprising a second strap member having a free end and a connection end;

a tension buckle comprising a pair of annular rings secured on the connection end, the free end being adjustably engaged with said buckle;
    a series of outboard strap corner plates each having a plurality of entry slots, a plurality of exit slots, and a slant corner slot, on the second strap with the second strap extending through one entry slot and one exit slot of at least one of said outboard strap corner plates;

strap connector brackets securing the second strap to at least another of the outboard strap corner plates, said plates forming the outboard strap to rectilinear outboard strap sections substantially parallel to and transversely aligned with the strap sections of the first strap;

each of the outboard strap corner plates having a chain aperture formed therein substantially transversely aligned with the openings of the inboard strap corner plates; and a link chain extending between and connected to each of the respective aligned openings and apertures.

5. A tire chain assembly for a vehicle wheel comprising:

inboard and outboard straps, each comprising a series of strap sections, at least one of the strap sections of each strap having opposite ends releasably and adjustably secured together to adjust the circumference of the respective inboard and outboard straps, such adjustment being effected by a buckle;

a ring member interposed between the respective strap sections to form the straps into substantially rectilinear strap sections;

the sections of the respective inboard and outboard straps being substantially transversely aligned and substantially parallel to one another;

the ring members between the sections being substantially transversely aligned in pairs; and link chains extending between the inboard and outboard straps at spaced locations, said link chains being secured to the rings and spanning the distance between the straps at said pairs of rings.

* * * * *